May 28, 1929.　　　　G. BABCOCK　　　　1,714,485
WEATHERPROOF COVER
Filed Aug. 17, 1927
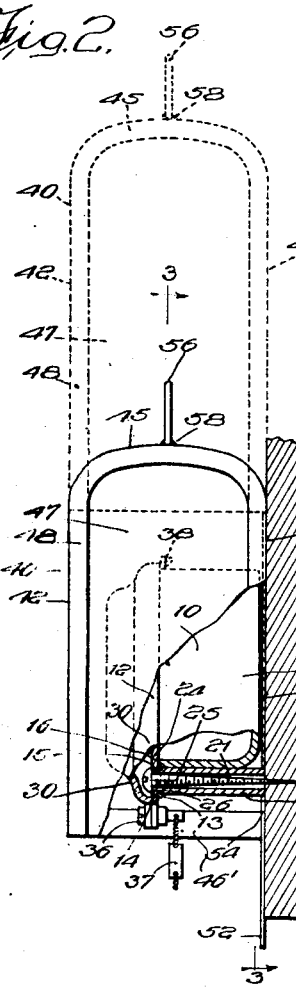
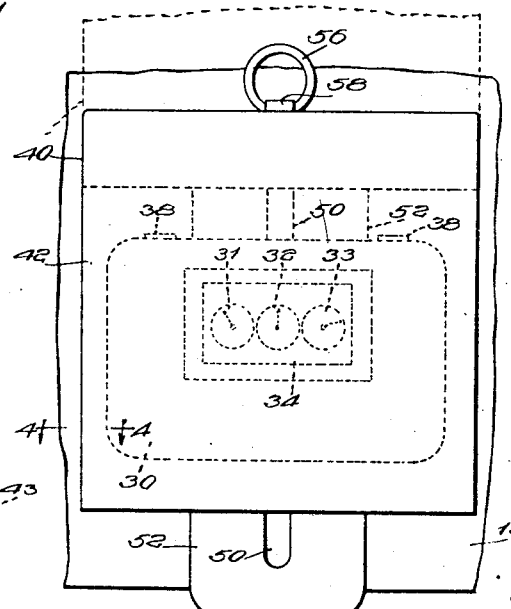
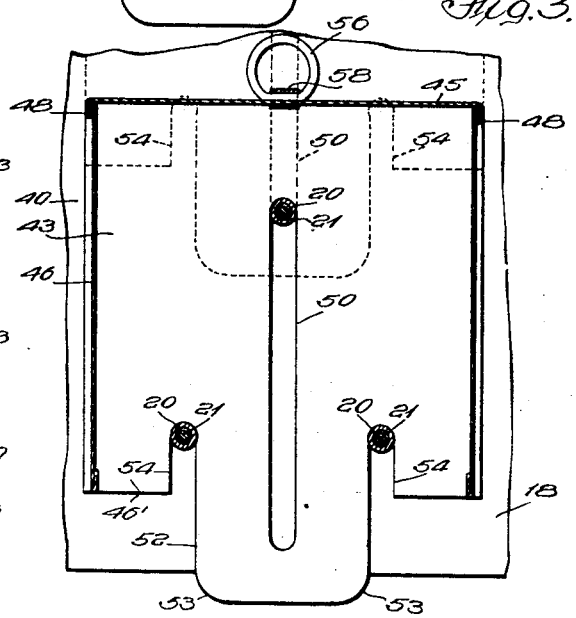
Witness:
William P. Kilroy
Inventor:
Garrison Babcock
By Brown, Critchley & Dienner
Att'ys Patented May 28, 1929.

1,714,485

UNITED STATES PATENT OFFICE.

GARRISON BABCOCK, OF SEATTLE, WASHINGTON.

WEATHERPROOF COVER.

Application filed August 17, 1927. Serial No. 213,563.

This invention relates to a weather-proof cover for meters and the like and its objects are the provision of a generally improved and simplified cover that may be economically produced and which will accommodate itself to the meter and meter mounting.

The invention provides for permitting convenient raising or lifting of the cover to expose the meter or other instrument for reading or access, and it provides a cover mounting with which the cover cannot be removed completely without removing the seal and opening the cover of the meter or other instrument casing.

The invention has particular utility in connection with the telechronometer and mounting disclosed in my co-pending application, Serial No. 508,037, filed October 15, 1921, and I shall herein illustrate and describe an embodiment of the present invention in connection therewith, but it is to be understood that the cover or hood of the present invention is not limited to use with a particular meter or instrument but may be employed as and where suitable or desired.

The invention is illustrated in the accompanying drawing, in which:

Fig. 1 is a front elevational view of a cover embodying the present invention showing the meter housed thereby in dotted lines, and also showing in dotted lines the raised position of the cover;

Fig. 2 is an end view broken away and in section to reveal the meter or instrument and mounting therefor, and showing the raised position of the cover in dotted lines;

Fig. 3 is a vertical section taken on the line 3—3 of Fig. 2; and

Fig. 4 is a detail horizontal section through one end of the cover taken on the line 4—4 of Fig. 1.

Referring now to the drawing the particular meter selected for illustration is a telechronometer of the type disclosed in my aforesaid co-pending application. The meter mechanism is enclosed in a housing or casing 10 comprising the casing portion 11 and the meter cover 12. The outer edge of the casing portion 11 is flared or flanged to provide a ledge portion 13 or a peripheral seat for a frame, or meter mechanism carrying plate 14, which is mounted upon the seat 13. Apertures 15 at the projecting ear portions of the plate 14 register with similar apertures 16 in the flange or ledge portion 13.

The meter is mounted upon a mounting board 18 or other suitable support by means of mounting posts 20, and suitable screws 21. The posts 20 have upper reduced ends extending into the registering apertures 15 and 16, as shown in Fig. 2, and the outer ends of the screws 21 are headed at 25 to be screwed into cooperation with the plate 24, while the threaded shanks pass through the tubular posts 20 and are screwed into the support 18. The reduced outer ends of the tubular posts 20 form shoulders 26 upon which the casing part 11 and plate 14 are firmly clamped by the screws 21.

There are three mounting post and screw mountings of this sort, one at the top substantially centrally between the opposite ends and two spaced along the bottom of the meter casing on opposite sides of the upper post. The lengths of the posts 20 to the shoulders 26 are preferably slightly greater than the depth or corresponding dimension of the meter casing, so that with the meter casing mounted upon these posts as shown, the back wall 28 thereof will be spaced slightly from the board or support 18.

The meter cover or lid 12 is provided with a marginal skirt 30 which covers the upper marginal edge of the meter casing 11.

The lid or cover 12 may be provided with an opening through which the indicating devices 31, 32 and 33 may be viewed. A glass or other suitable covering 34 is provided for this opening. The meter cover or lid 12 is held against opening by a screw 36 and a suitable seal 37, breaking of which is necessary before the lid 12 can be opened. The meter cover or lid 12 is held at the opposite side by suitable tongue and slot engagement at 38, 38.

The weather-proof cover with which the present invention is particularly concerned is preferably formed of sheet metal. It comprises an inverted and downwardly opening, generally U-shaped sheet 40 forming the generally parallel front and back walls 42 and 43 with the rounded roof 45 and open at the bottom at 46. The opposite ends of the hood may be closed by end walls 46 and 47, the marginal edges of the sheet 40 being turned over the marginal edges of the end walls 46 and 47 at 48, and suitably secured thereto. The back wall 43 of the cover has a vertical slot 50 through which the upper generally centrally disposed mounting post 20 passes. The slot 50 is elongated sufficiently to permit the cover to be raised or lifted sufficiently to permit reading of the meter or other instruments. The raised position of the cover is shown in dotted lines in Figs. 1, 2 and 3, and when in the raised position it may be swung slightly to either side about the upper post 20.

To provide the desired elongation of the slot 50 without unnecessarily lengthening the back wall 43 of the hood or cover, the lower edge of the back wall is provided with a depending tongue 52 through which the slot 50 may extend below the lower edge of the cover. The lower corners of the tongue 52 are preferably rounded at 53 to facilitate movement between the lower posts 20, and the width of this tongue is substantially equal to or just slightly less than the distance between the posts 20 so that as the cover is lowered or closed the tongue 52 passes between the lower post 20 and by its engagement therebetween holds the cover rigidly and firmly in place and against tilting movement. The extension of the tongue 52 below the cover not only provides the necessary elongation for the slot 50 but serves, in effect, as a guide, which enters between the lower posts 20 ahead of the lower edge of the cover and guides the cover into closed position.

The lower edge of the back wall 43 of the cover is provided along each side of the tongue 52 with a vertical slot or notch 54, 54, which open from the lower edge of the back wall 43 and engage over the lower posts 20 to hold the cover firmly in closed position.

For lifting or raising the cover the rounded roof 45 may be provided with an eye 56 which may be swingably secured to the roof 45, as indicated at 58.

The back wall 43 of the cover lies in the space between the back wall 28 of the meter casing 11 and the support 18, and the cover accommodates itself to the meter and meter mounting and it protects the meter from the weather without rendering same inaccessible. The cover may be conveniently lifted or raised to permit reading of or access to the meter or other instrument, but obviously it cannot be removed completely without removing or breaking the seal 37 and opening the meter cover 12 to permit access to and removal of the upper mounting screw and post.

I claim:—

1. In combination, a support, an instrument, a post for mounting the instrument upon said support, and a cover for the instrument mounted upon said post with a wall of the cover lying between the instrument and support and provided with an elongated opening receiving the post and permitting the cover to be moved for access to the instrument.

2. In combination, a support, an instrument, a plurality of posts for mounting the instrument upon said support, and a cover for the instrument mounted upon said posts with a wall of the cover lying between the instrument and support and provided with elongated openings receiving the posts and permitting the cover to be moved for access to the instrument.

3. In combination, a support, an instrument, a plurality of posts, one along the top of the instrument and a pair along the bottom of the instrument for mounting the instrument upon said support, a cover for the instrument having a wall lying between the instrument and the support, said wall having a depending tongue fitting between the bottom posts, and an elongated slot in said wall for receiving the top post and permitting the cover to be moved for access to the instrument, said slot extending into said depending tongue.

4. In combination, a support, an instrument, a plurality of posts, one along the top of the instrument and a pair along the bottom of the instrument for mounting the instrument upon said support, a cover for the instrument having a wall lying between the instrument and the support, said wall having a depending tongue fitting between the bottom posts, an elongated slot in said wall for receiving the top post and permitting the cover to be moved for access to the instrument, said slot extending into said depending tongue, and a pair of elongated openings disposed on opposite sides of said tongue and opening from the lower edge of said wall for receiving said bottom posts.

5. In combination, a support, an instrument, means for mounting the instrument upon said support and a cover having an elongated slot for receiving said mounting means and permitting the cover to be moved for access to the instrument, said slot being closed to prevent the removal of said cover with said mounting means in place.

6. In combination, a support, an instrument having an enclosing housing and a lid therefor, means for mounting the instrument upon said support, and a cover having an elongated slot for receiving said mounting means and permitting the cover to be moved for access to the instrument, said slot being closed to prevent removal of said cover with said mounting means in place, and said mounting means being arranged to prevent removal thereof when said lid is closed.

7. In combination, a support, an instrument, a plurality of posts for mounting the instrument upon said support, and a cover having an elongated slot for receiving one of said posts and permitting the cover to be moved for access to the instrument, said slot being closed to prevent removal of said cover with said mounting means in place, and endwise opening slots engaging over other of said posts when the cover is closed.

8. In combination, a support, an instrument, a plurality of posts for mounting the instrument upon said support, a cover having an elongated slot for receiving one of said posts and permitting the cover to be moved for access to the instrument, said slot being closed to prevent removal of said cover with said mounting means in place, and a projecting tongue engageable between other of said posts for guiding the cover into closed position and for holding the cover in place when closed.

In witness whereof, I hereunto subscribe my name this 26th day of July, 1927.

GARRISON BABCOCK.